US009529454B1

(12) United States Patent
McGrath et al.

(10) Patent No.: US 9,529,454 B1
(45) Date of Patent: Dec. 27, 2016

(54) THREE-DIMENSIONAL USER INPUT

(71) Applicant: Microsoft Technology Licensing, LLC, Redmond, WA (US)

(72) Inventors: Michael David McGrath, Duvall, WA (US); Jonathan Ross Hoof, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/745,197

(22) Filed: Jun. 19, 2015

(51) Int. Cl.
*G06F 3/0346* (2013.01)
*G06F 3/0484* (2013.01)
*G06F 3/0487* (2013.01)
*G06F 3/01* (2006.01)

(52) U.S. Cl.
CPC ............ *G06F 3/0346* (2013.01); *G06F 3/013* (2013.01); *G06F 3/0487* (2013.01); *G06F 3/04845* (2013.01)

(58) Field of Classification Search
CPC .... G06F 3/0346; G06F 3/013; G06F 3/04845; G06F 3/0487
USPC ........................................................ 345/158
See application file for complete search history.

(56) References Cited

U.S. PATENT DOCUMENTS

| 6,184,867 | B1 | 2/2001 | Kandogan et al. |
| 8,384,665 | B1 | 2/2013 | Powers, III et al. |
| 8,624,962 | B2 | 1/2014 | Lopes et al. |
| 8,799,821 | B1* | 8/2014 | De Rose ............. G06F 3/04842 715/821 |
| 8,878,656 | B2 | 11/2014 | Tidemand et al. |
| 2007/0081716 | A1* | 4/2007 | Ha ..................... H04N 13/0018 382/154 |
| 2009/0202155 | A1* | 8/2009 | Hayashi ................ G01B 11/24 382/203 |
| 2009/0228841 | A1 | 9/2009 | Hildreth |
| 2012/0117514 | A1 | 5/2012 | Kim et al. |
| 2012/0212509 | A1 | 8/2012 | Benko et al. |

(Continued)

FOREIGN PATENT DOCUMENTS

WO    2013144807 A1    10/2013

OTHER PUBLICATIONS

"Here is a Simple 3D "Virtual Joystick" Implementation for Unreal Engine VR Apps", Retrieved on: Apr. 9, 2015 Available at: https://community.leapmotion.com/t/here-is-a-simple-3d-virtual-joystick-implementation-for-unreal-engine-vr-apps/2604.

(Continued)

*Primary Examiner* — Fred Tzeng
(74) *Attorney, Agent, or Firm* — Judy Yee; Micky Minhas

(57) ABSTRACT

Examples are disclosed herein that relate to processing three-dimensional user input. One example provides a method of processing user input in a three-dimensional coordinate system, comprising receiving a user input of an origin reset for the three-dimensional coordinate system, responsive to receiving the user input of the origin reset, resetting an origin of the three-dimensional coordinate system, receiving three-dimensional user input in the three-dimensional coordinate system, while the origin remains set, measuring at least one three-dimensional displacement of the three-dimensional user input relative to the origin, and causing movement of a user interface element displayed in a user interface, the movement based on the at least one measured three-dimensional displacement.

20 Claims, 4 Drawing Sheets

(56) References Cited

U.S. PATENT DOCUMENTS

| | | | | |
|---|---|---|---|---|
| 2012/0280899 | A1* | 11/2012 | Huhtala | H04N 13/0484 345/156 |
| 2013/0127842 | A1* | 5/2013 | Lee | G06T 15/00 345/419 |
| 2013/0154913 | A1 | 6/2013 | Genc et al. | |
| 2013/0187919 | A1 | 7/2013 | Medioni et al. | |
| 2013/0326422 | A1* | 12/2013 | Kang | G06F 3/012 715/841 |
| 2014/0176676 | A1* | 6/2014 | Lin | H04N 13/0472 348/46 |
| 2014/0235311 | A1 | 8/2014 | Weising et al. | |
| 2014/0282274 | A1 | 9/2014 | Everitt et al. | |

OTHER PUBLICATIONS

Fong, et al., "Novel Interfaces for Remote Driving: Gesture, Haptic and PDA", In Proceedings of SPIE Telemanipulator and Telepresence Technolgies VII, Nov. 2000, 12 pages.

Kratz, et al., "PointPose: Finger Pose Estimation for Touch Input on Mobile Devices using a Depth Sensor", In Proceedings of ACM Interactive Tabletops and Surfaces Conference, Oct. 6, 2013, 8 pages.

Rubino, Daniel, "What Microsoft revealed about Xbox and Windows 10 today at GDC 2015", In Proceedings of Game Developers Conference, Mar. 4, 2015, 90 pages.

"3D Depth Camera Hand, Face and Body Tracking Solutions", Published on: May 30, 2011 Available at: http://www.gesturetek.com/3ddepth/introduction.php.

Cota, M. et al., "DCS 3D Operators in Industrial Environments: New HCI Paradigm for the Industry," Virtual, Augmented and Mixed Reality—Systems and Applications, vol. 8022 of the series Lecture Notes in Computer Science, Jul. 21, 2013, 10 pages.

ISA European Patent Office, International Search Report and Written Opinion issued in PCT Application No. PCT/US2016/036542, Sep. 7, 2016, WIPO, 11 pages.

* cited by examiner

THREE-DIMENSIONAL USER INPUT

BACKGROUND

A variety of approaches exist for receiving three-dimensional user input. In one example, the position of a cursor in a user interface is controlled based on the position of a user's hand. The position of the user's hand may be measured relative to a fixed coordinate system origin, for example.

SUMMARY

Examples are disclosed herein that relate to processing three-dimensional user input. One example provides a method of processing user input in a three-dimensional coordinate system, comprising receiving a user input of an origin reset for the three-dimensional coordinate system, responsive to receiving the user input of the origin reset, resetting an origin of the three-dimensional coordinate system, receiving three-dimensional user input in the three-dimensional coordinate system, while the origin remains set, measuring at least one three-dimensional displacement of the three-dimensional user input relative to the origin, and causing movement of a user interface element displayed in a user interface, the movement based on the at least one measured three-dimensional displacement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A variety of approaches exist for receiving three-dimensional user input. In one example, the position of a cursor in a user interface is controlled according to the three-dimensional position of a user's hand. The cursor position may mirror movements of the user's hand as they occur. However, in this approach it may be difficult to receive displacement (e.g., a difference or distance between positions), and not merely position, as input, due to the persistent movement of the origin with the user's hand. Other approaches to receiving three-dimensional user input employ a fixed origin with which three-dimensional positions may be measured. Fixed origins can create a suboptimal user experience, however, as they may force users to return to a fixed world-space position to return to the origin. Accordingly, examples are disclosed herein that relate to processing three-dimensional input in a three-dimensional coordinate system having an origin that may be reset based on user input.

Figure 1:
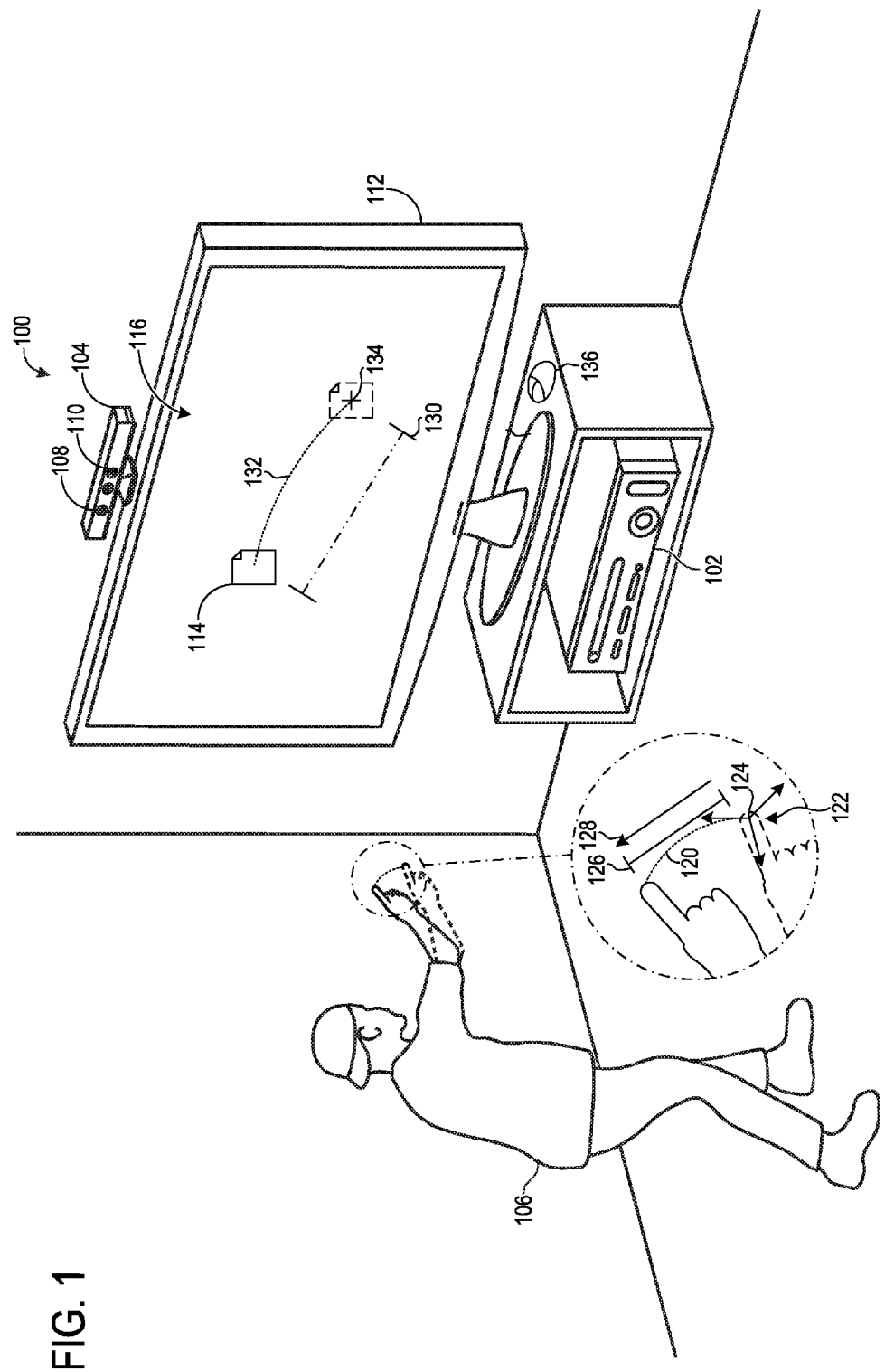
FIG. 1 shows an example environment for interaction with a computing device.

FIG. 1 shows an example environment 100 for interaction with a computing device 102. Environment 100 is depicted as a home environment, though it will be appreciated that the approaches described herein may be used in any suitable environment, including but not limited to professional, commercial, educational, and outdoor environments.

Computing device 102 is depicted as a multimedia computing device or game console, but may take any suitable form, including but not limited to a general purpose computing device, laptop computing device, tablet/phone/other mobile devices, etc. Computing device 102 is operatively coupled to, and configured to receive input from, a sensor system 104. Sensor system 104 is operable to receive input from a user 106, and may receive user input in a variety of forms; for example, the sensor system may include an outward-facing image sensor 108 (e.g., color camera, infrared camera, depth camera) for receiving gestural inputs from the user. Sensor system 104 may alternatively or additionally include a microphone 110 for receiving voice input from user 106. Still other hardware for receiving user input not shown in FIG. 1 may be included in sensor system 104 or operatively coupled thereto, including but not limited to an inertial measurement unit (e.g., including accelerometers and/or gyroscopes). Example hardware that may be included in sensor system 104 is described below with reference to FIG. 5.

Computing device 102 may also be operatively coupled to a display device 112. Display device 112 may display output received from computing device 102, where at least a portion of the output may be rendered by the computing device based on user input received via sensor system 104. Display device 112 may incorporate any suitable display technologies, including but not limited to liquid crystal display (LCD), light-emitting diode (LED), and plasma display technologies. Other display device types are also contemplated as described below, including but not limited to wearable display devices.

Sensor system 104 may be operable to receive three-dimensional user input from user 106. FIG. 1 depicts an exemplary scenario in which user 106 supplies three-dimensional user input via hand motions detected by sensor system 104 (e.g., via outward-facing image sensor 108). In response to the reception of three-dimensional user input, computing device 102 renders graphical output for display device 112 that reflects the hand motions performed by user 106—specifically, a user interface element in the form of a file icon 114 in a user interface 116 rendered on the display device may be moved in virtual space based on a physical path 120 traced out by the hand motions performed by the user.

One or more attributes of three-dimensional user input may be measured relative to a coordinate system in causing movement of a user interface element. FIG. 1 shows an enlarged view of physical path 120, traced out by three-dimensional hand motion (e.g., index finger motion) of user 106, where attributes of the physical path may be measured relative to a three-dimensional coordinate system 122—specially, relative to an origin 124 of the coordinate system. While shown as a Cartesian coordinate system (e.g., x/y/z), it will be appreciated that coordinate system 122 may take any suitable form (e.g., cylindrical, spherical).

Origin 124 may be dynamically reset responsive to user input resetting the origin. In the example shown in FIG. 1, user 106 supplies a user input of an origin reset by performing a hand gesture—in particular, an "air tap" hand gesture, where the origin reset may be initiated in response to the depth of the user's index finger falling below a threshold depth (e.g., by pushing the finger "in" along the z-axis). "Depth" as used herein refers to a distance between a surface imaged by a sensor system and an optical element of the sensor system—e.g., the physical space z-coordinate distance from the user's index finger to outward-facing image sensor 108.

It will be appreciated that any suitable hand gesture may be used as the user input of the origin reset, including but not limited to pinching, fist clenching, hand or finger spreading, hand rotation, etc. Gestures performed via other body parts such as the head may be used as well. A gesture may be selected for origin resets on the basis of the gesture being consistently identifiable and one that does not typically occur in the course of human movement not intended to cause an origin reset, for example. The "air tap" hand gesture described above and depicted in FIG. 1 may be one example of such a gesture, and may be considered an explicit user input of an origin reset, as it may not occur in the course of typical human movement. In some implementations, explicit user input, and not implicit user input (e.g., input that does occur in the course of typical human movement or is not consistently identifiable), may be used for origin resets. Any other suitable input may be used for the origin reset, however, such as voice input. By allowing the origin of a three-dimensional coordinate system to be reset responsive to user input, three-dimensional user input including displacement may be received at a location desired by a user without the user being tethered to a fixed location in physical space.

After receiving the user input of the origin reset, one or more attributes of physical path 120 may be measured relative to origin 124. Shown in the enlarged view of FIG. 1, a three-dimensional displacement 126 of physical path 120 may be one such attribute measured relative to origin 124. In some examples, three-dimensional displacement 126 may be measured by combining (e.g., averaging) a plurality of displacements measured as physical path 120 is traced out. In other examples, displacement 126 may be measured based on the endpoints of physical path 120 following termination of the physical path, where termination of the physical path may be carried out in various manners as described below. A given displacement may be calculated as the Cartesian distance between two three-dimensional points in three-dimensional coordinate system 122, for example, though any suitable method of calculating displacement may be employed.

Alternatively or in addition to displacement 126, a direction 128 of physical path 120 may be measured relative to origin 124. Direction 128 may take any suitable form, such as one or more angles (e.g., theta, phi). Similarly to displacement 126, direction 128 may be measured by comparing the endpoints of physical path 120 or by combining a plurality of directions measured as the physical path is traced out. In still other examples, a vector (e.g., comprising a magnitude and direction) may be measured based on physical path 120, alternatively or in addition to measurement of displacement 126 and direction 128. Displacement 126 and direction 128 may be the magnitude and the direction of the vector, respectively, for example.

In some implementations, origin 124 may be reset responsive to the displacement of three-dimensional user input exceeding a threshold displacement—e.g., responsive to displacement 126 exceeding the threshold displacement. Such an approach may impose a limit on the physical space distance between origin 124 and the input mechanism (e.g., finger of user 106), which may allow the user to avoid performing excessively large movements in physical space.

Movement of user interface elements in a user interface may be caused based on one or more measured attributes of three-dimensional user input. FIG. 1 illustrates how movement of file icon 114 may be caused based on one or more measurements of physical path 120. In some implementations, causing movement of file icon 114 may include translating (e.g., in the virtual space in which user interface 116 is rendered) the file icon a distance determined by scaling a magnitude of a measured three-dimensional displacement—e.g., by scaling displacement 126 of physical path 120. FIG. 1 shows a distance 130 through which file icon 114 may be translated in virtual space, where the distance in this example is derived by scaling up the magnitude of displacement 126. Alternatively or additionally, causing movement of file icon 114 may include translating the file icon along a direction of a measured three-dimensional displacement—e.g., along direction 128 of physical path 120.

It will be appreciated that movement of file icon 114 in user interface 116 may or may not include representing depth in the three-dimensional user input that caused movement of the file icon. For example, the virtual space in which user interface 116 is rendered may be three-dimensional, in which case changes to depth may be represented by adjusting the size (e.g., shrinking, enlarging) of user interface elements displayed therein or in any other suitable manner. In other implementations, depth may not be represented—for example, the virtual space in which user interface 116 may instead be two-dimensional, in which case changes to two (e.g., x/y) of three coordinates may be represented.

In some implementations, movement of file icon 114 may include updating the position of the file icon upon cessation of the supply of three-dimensional user input without displaying intermediate positions. In this example, user 106 may perceive file icon 114 to "jump" instantaneously from its initial position to the final position upon cessation of three-dimensional user input. In other examples, assumption of the new position by file icon 114 may be animated following cessation of three-dimensional user input, such that translation of the file icon from the initial position to the new position is conveyed in a suitable manner. In such examples, animation of the translation may include translating file icon 114 at a speed proportional to a speed at which physical path 120 was traced out—e.g., by scaling the physical speed of physical input to derive a virtual speed at which to translate the file icon in virtual space.

In some implementations, movement of file icon 114 may be caused before the supply of three-dimensional user input is ceased—e.g., before physical path 120 is fully traced out. For example, the position of file icon 114 may be updated at an adjustable rate as physical path 120 is traced out, which may provide visual feedback to user 106 in a relatively continuous manner. In some examples, file icon 114 may be translated along a virtual path 132 derived from physical path 120 as the physical path is traced out. Virtual path 132 may exhibit varying correspondences to physical path 120; in one example the virtual path may exhibit the same shape as that of the physical path but have a magnitude derived by scaling the magnitude of the physical path.

The final position at which file icon 114 resides may be determined responsive to the cessation of three-dimensional user input. Cessation of three-dimensional user input, such as terminating physical path 120, may be effected in various suitable manners—for example, three-dimensional input may be ceased in response to the index finger of user 106 exceeding a threshold depth (e.g., by pulling the finger "out"). Such an approach, when combined with the air tap gesture described above for initiating the origin reset, may provide an intuitive mechanism for providing three-dimensional input that is at least somewhat analogous to pressing a physical button. In this example, various depth ranges may be used to effect various modes of user input processing—for example, three-dimensional user input having depth within a first depth range may effect measurement of one or more attributes of the user input and potentially cause movement of one or more user interface elements, while three-dimensional user input having depth exceeding the first depth range may be interpreted as an origin reset, and three-dimensional user input having depth falling below the first depth range may be interpreted as cessation of the supply of three-dimensional user input. With the supply of three-dimensional user input ceased, surfaces used to supply such input e.g., the surface of the index finger of user 106—may be tracked by sensor system 104. However, in this mode changes to user interface 116 may not be made in response to motion of these surfaces (e.g., until a user input of an origin reset is received).

User interface 116 may present graphical content representing the reception of three-dimensional user input and/or movement of user interface elements therein. For example, user interface 116 may present an indicator 134, which may take any suitable form, representing the location (e.g., the virtual space location to which the physical location of the origin is mapped) of origin 124 as it is set according to the most recent origin reset. Alternatively or additionally, user interface 116 may present graphical content representing virtual path 132—e.g., the virtual path itself, continuously updated at a suitable rate as it is derived from physical path 120, a representation of distance 130, a representation of direction 128, and/or a vector representing the instant net displacement and direction.

As alluded to above, the approaches described herein are not limited to the manner of supplying input depicted in FIG. 1. For example, in other implementations user 106 may supply three-dimensional user input by manipulating a physical input device held or worn by the user in physical space. One example of such an input device may be a glove wearable on a hand of user 106 and operable to provide three-dimensional input to computing device 102. FIG. 1 shows another exemplary input device in the form of a three-dimensional mouse 136 operable to provide three-dimensional input to computing device 102. Three-dimensional mouse 136 may include one or buttons that, when actuated, may effect entry/exit to/from the supply of three-dimensional input—e.g., a button may be pressed to reset origin 124 and pressed again to cease supply of three-dimensional user input. The wearable glove, three-dimensional mouse 136, and other potential physical input devices operable to generate three-dimensional user input may include suitable hardware for collecting three-dimensional data, such as accelerometers and/or gyroscopes, for example.

The approaches described herein for processing three-dimensional user input may enable user 106 to supply input in a hands-free manner (e.g., without holding or otherwise manipulating a physical input device) that might otherwise be conveyed using a physical input device. A joystick, for example, may be a suitable mechanism for supplying displacement and direction, as the location at which the joystick naturally centers serves as a fixed origin from which displacement and direction can be measured. In contrast, the approaches described herein facilitate reception of the same type of input while allowing a user to determine the most convenient location in physical space from which to supply input.

In some implementations, processing user input may include receiving three-dimensional user input via an outward-facing image sensor in addition to receiving a user input of a gaze direction. As described in further detail below, the gaze direction may be used to select or otherwise identify a user interface element in a user interface. Attributes of the three-dimensional user input may be used to effect movement of the user interface element.

Figure 2:
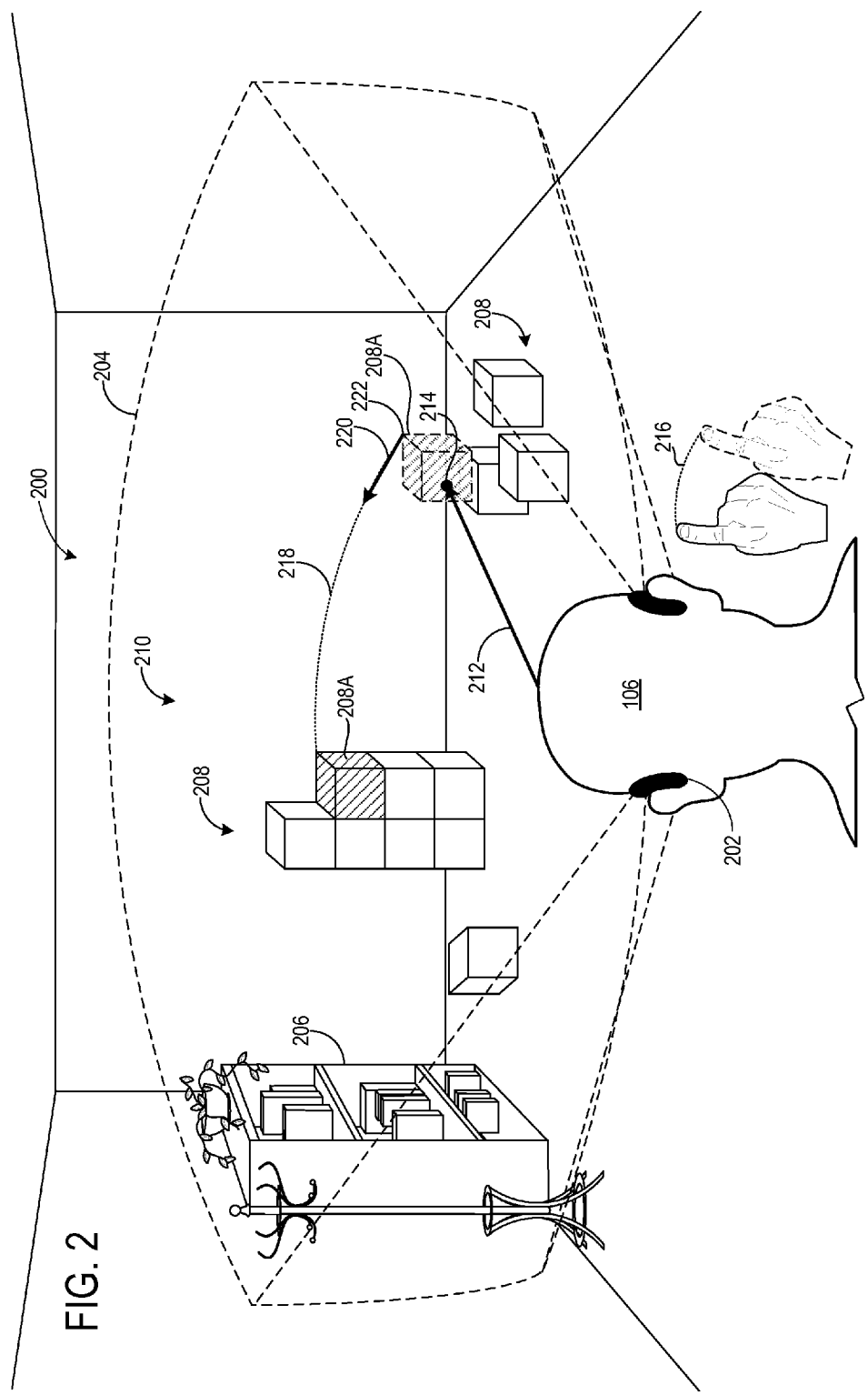
FIG. 2 shows an environment for interaction with a wearable computing device.

FIG. 2 shows an environment 200 for interaction with a wearable computing device shown in the form of a head-mounted display (HMD) device 202 worn by user 106. HMD device 202 comprises a see-through display enabling the viewing of both real and presented virtual imagery to user 106, thereby providing a so-called "mixed reality" or "augmented reality" (AR) experience. The see-through display may thus enhance or otherwise alter user perception of environment 200 by modifying the appearance of the environment. Other display device types also may be used including displays operable to provide mixed reality or AR experiences without a see-through display. For example, a display device having a camera may display a mixed reality mode by displaying the real world background as a camera viewfinder image and mixing virtual imagery with the background viewfinder image. Virtual reality (VR) HMD devices are further contemplated, which may be configured to substantially replace a user's field of view (FOV) with virtual imagery via an opaque display. It will be appreciated that the examples disclosed herein may be used with any other suitable type of display device.

Although not shown in FIG. 2, HMD device 202 may include or otherwise be operatively coupled to a computing device configured to effect the approaches described herein. The computing device may, for example, drive the see-through display of HMD device 202, render virtual imagery, receive user input from one or more sensors, and/or provide output to a communication subsystem. The computing device, one or more sensors, and/or communication subsystem, among other potential hardware, may be integrally housed in HMD device 202 or remotely housed and coupled to the HMD device. Further detail regarding exemplary HMD device and computing device configurations is described below with reference to FIGS. 4 and 5.

FIG. 2 schematically depicts a FOV 204 of HMD device 202. FOV 204 represents the spatial region perceived by user 106 in which HMD device 202 may display virtual imagery. The angular extent of FOV 204 may be equal to, greater than, or less than the portion of environment 200 viewable through the see-through display of HMD device 202. In the depicted example, physical objects such as furniture 206, and virtual imagery such as blocks 208, are perceptible by user 106 wearing HMD device 202. Blocks 208 may be displayed by HMD device 202 in a user interface 210 as part of a game application in which user input is operable to alter the position (e.g., Cartesian x/y/z) and/or rotational orientation (e.g., theta, phi) of the blocks on an individual or group basis, for example.

Although not shown in FIG. 2, HMD device 202 may include a gaze sensor operable to measure the gaze direction of one or both of the eyes of user 106. A gaze direction 212, for example, may be determined via the gaze sensor for user 106, and may further be mapped to a point 214 in user interface 210 by extending the gaze direction until an intersection with at least one user interface element is identified. In this example, point 214 overlaps a user interface element of user interface 210—particularly, a block 208A, where point 214 is shown overlapping the block in an initial state prior to its movement responsive to three-dimensional user input as described below. Block 208A may thus be selected or otherwise identified by a user input of a gaze direction 212. FIG. 2 shows one non-limiting example of visual feedback that may be displayed to indicate selection of block 208A in the form of shading, though any suitable visual feedback may be employed. With block 208A selected, the position of the block in FOV 204 may be altered responsive to three-dimensional user input.

Block 208A may be moved in user interface 210 based on a physical path 216 traced out by hand movements performed by user 106. While not shown in FIG. 2, HMD device 202 may include an outward-facing image sensor configured to detect hand motions. As with the approaches depicted in FIG. 1, one or more attributes of physical path 216 may be measured on which movement of block 208A may be based, including but not limited to a displacement and a direction of the physical path. The one or more attributes may be measured relative to a coordinate system origin which may be reset in any suitable way. In one example, the coordinate system origin is reset upon selection of a user interface element (e.g., block 208A) via a user input of a gaze direction (e.g., gaze direction 212)—e.g., reset to the point (e.g., point 214) to which the gaze direction is mapped. Alternatively, the origin may be reset to a predetermined location on the block responsive to selection of the block via the gaze direction. The predetermined location may be stipulated by the game application, for example. In either case, three-dimensional user input supplied following selection of the block may be processed such that movement of the block is caused beginning at the point (e.g., point 214) to which the gaze direction is mapped.

As shown in FIG. 2, block 208A may be translated along a virtual path 218 (e.g., in the virtual space in which graphical content may be rendered by HMD device 202) that may be derived from physical path 216—e.g., derived by scaling the physical path. Accordingly, movement of block 208A may be based on at least one measured three-dimensional displacement (e.g., of physical path 216) and may begin at the point to which gaze direction 212 is mapped. FIG. 2 shows the final location of block 208A, arrived at following reception of suitable user input (e.g., exceeding threshold depth) ceasing position control of the block based on three-dimensional user input, for example. It will be appreciated that one or more adjustments may be automatically made to the position of block 208A, for example to obtain a desired geometric arrangement.

In some implementations, a vector, comprising a head and a tail, may be determined based on three-dimensional displacement, with the tail of the vector located at the point to which a gaze direction is mapped. FIG. 2 shows a vector 220 determined based on the three-dimensional displacement of physical path 216, with a tail 222 located at point 214 to which gaze direction 212 is mapped. Vector 220 may be reported to user interface 210 such that any suitable movement of block 208A or other user interface element may be effected based on the vector (e.g., in proportion to the magnitude of the vector, along the direction of the vector).

User 106 may select one or more attributes of physical path 216 to be reported to user interface 210. For example, user 106 may elect to report one or more of vector 220, a direction of physical path 216 (e.g., for contexts in which the game application stipulates a fixed displacement), and a displacement of the physical path (e.g., for contexts in which the game application stipulates a fixed direction).

The approaches to processing three-dimensional user input using gaze direction are not limited to the game application scenario depicted in FIG. 2, and may be employed in any suitable scenario. For example, gaze direction may be used to select one of two or more windows in an operating system such that subsequently received three-dimensional user input may be applied to the selected window. In another example, gaze direction may be used to select among a plurality of virtual light sources in a 3D modeling application, with subsequently received three-dimensional user input used to position the selected light source in 3D space. In yet another example, gaze direction may be used to identify a location on a 3D model in a sculpting application, with subsequently received three-dimensional user input used to modify (e.g., extrude, compress) the surface of the model at the identified location. In still another example, gaze direction may be used to select among a large number of units in a strategy game, with subsequently received three-dimensional user input used to send instructions to the selected units. These examples are generally illustrative of the potential advantages of using gaze direction in combination with three-dimensional user input—e.g., obviating physical input device manipulation and reducing effort in selecting among large numbers of user interface elements.

It will be appreciated that user input may effect various types of adjustments to user interface elements, including adjustments not depicted in FIGS. 1 and 2. User interface adjustment may include translation and/or rotation, for example, and may be performed in one, two, or three dimensions. For example, one (e.g., vertical) or two dimensional (e.g., vertical, horizontal) scrolling of a user interface element may be carried out responsive to user input.

Figure 3:
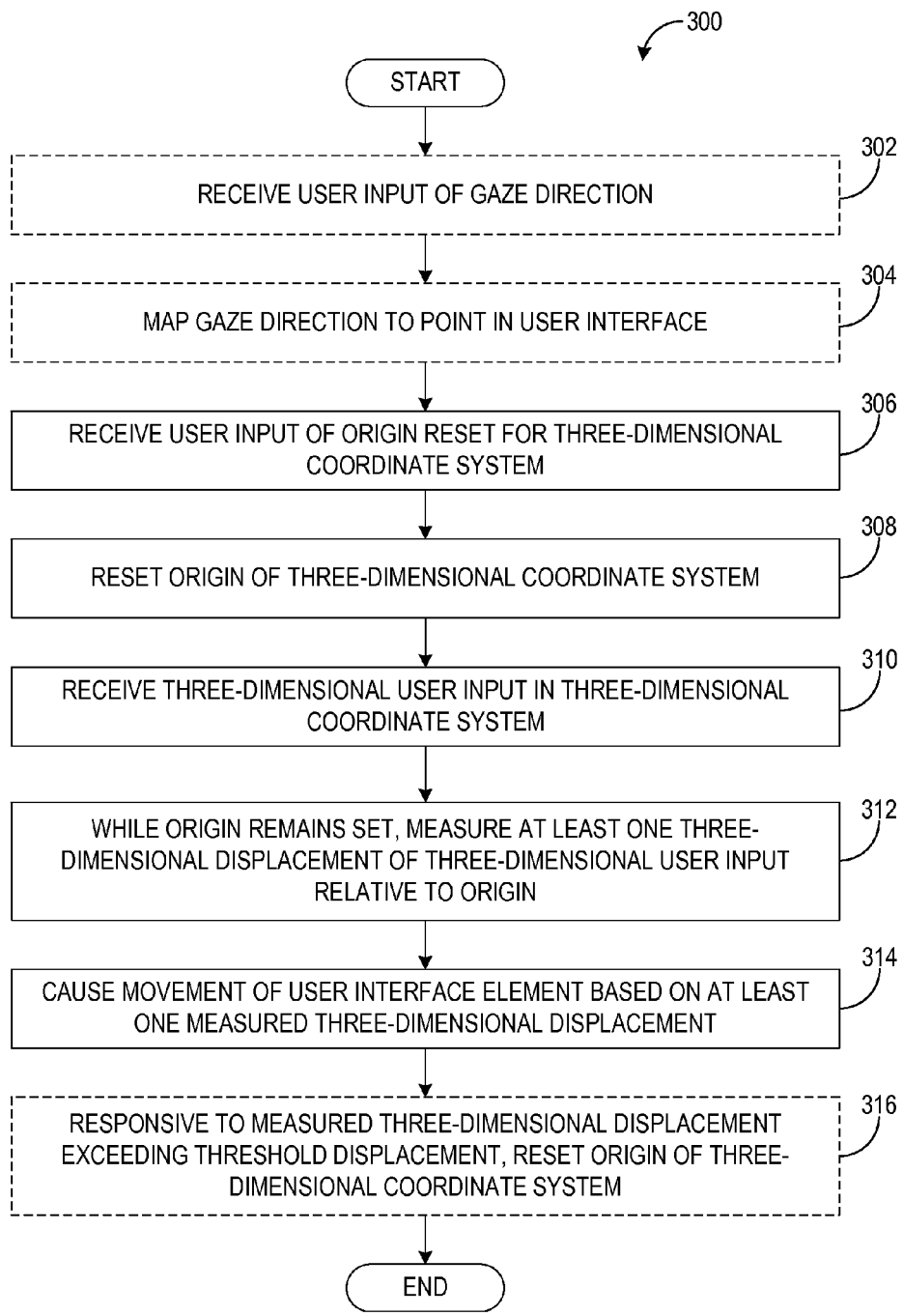
FIG. 3 shows a flowchart illustrating a method of processing user input in a three-dimensional coordinate system.

FIG. 3 shows a flowchart illustrating a method 300 of processing user input in a three-dimensional coordinate system. Method 300 may be executed by computing device 102 (FIG. 1) in combination with sensor system 104, by a computing device operatively coupled to HMD device 202 (FIG. 2) using a gaze sensor and an outward-facing image sensor, and/or by a computing device 500 described below with reference to FIG. 5, for example.

At 302 of method 300, a user input of a gaze direction is optionally received. The gaze direction may be determined by a gaze sensor, for example.

At 304 of method 300, the gaze direction is optionally mapped to a point in a user interface. The point may be determined by extending the gaze direction until an intersection of the gaze direction with a user interface element is detected.

At 306 of method 300, a user input of an origin reset for a three-dimensional coordinate system is received. The origin reset may comprise a hand gesture or voice input, for example.

At 308 of method 300, responsive to receiving the user input of the origin reset, an origin of the three-dimensional coordinate system is reset. The location at which the reset origin corresponds may be a predetermined location on a user interface element, the point of intersection of the gaze direction, a location of a body part (e.g., hand, index finger) used to convey the origin reset, etc.

At 310 of method 300, three-dimensional user input is received in the three-dimensional coordinate system. The three-dimensional user input may be received via an outward-facing image sensor (e.g., depth camera) or via a physical input device such as a three-dimensional mouse.

At 312, while the origin remains set (e.g., until reception of a subsequent user input of an origin reset), at least one three-dimensional displacement of the three-dimensional user input is measured relative to the origin. In some examples, a single three-dimensional displacement may be measured following cessation of the supply of three-dimensional user input—e.g., based on the initial and final points of the input. In other examples, two or more three-dimensional displacements may be measured at a suitable rate during the reception of the three-dimensional user input.

At 314 of method 300, movement of a user interface element in the user interface is caused. The movement is based on the at least one measured three-dimensional displacement. If the gaze direction is received at 302, the movement may begin at the point to which the gaze direction was mapped in the user interface at 304, for example. The point may overlap the user interface element. Causing movement of the user interface element may include translating the user interface element along a direction of the three-dimensional displacement, translating the user interface element a distance determined by scaling a magnitude of the three-dimensional displacement, and/or translating the user interface element at a speed proportional to a speed at which the three-dimensional displacement was supplied. The user interface element may be selected by the user input of the gaze direction, if received at 302, for example.

At 316 of method 300, the origin of the three-dimensional coordinate system is optionally reset responsive to a measured three-dimensional displacement exceeding a threshold displacement.

Figure 4:
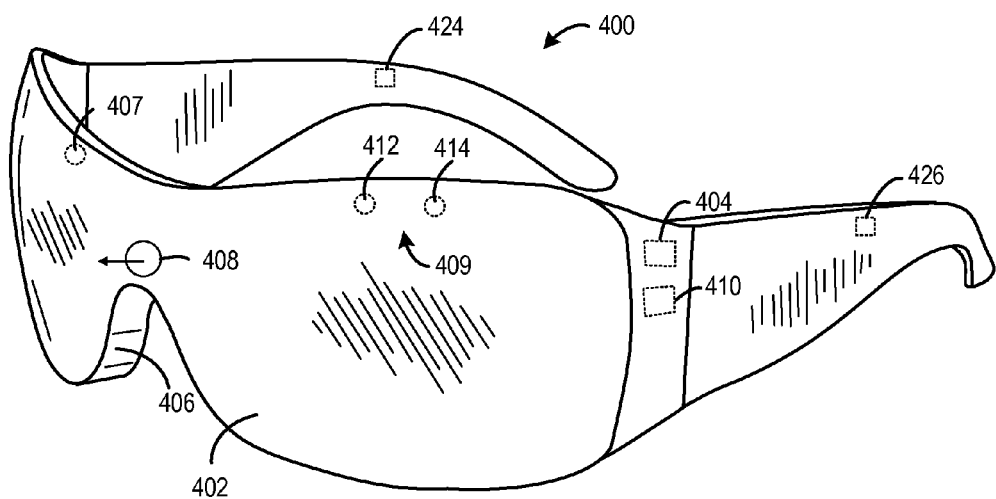
FIG. 4 shows an example head-mounted display (HMD) device.

FIG. 4 shows a non-limiting example of an HMD device 400 in the form of a pair of wearable glasses with a transparent display 402. It will be appreciated that an HMD device may take any other suitable form in which a transparent, semi-transparent, and/or non-transparent display is supported in front of a viewer's eye or eyes.

The HMD device 400 includes a controller 404 configured to control operation of the see-through display 402. The see-through display 402 may enable images such as holographic objects to be delivered to the eyes of a wearer of the HMD device 400. The see-through display 402 may be configured to visually augment an appearance of a real-world, physical environment to a wearer viewing the physical environment through the transparent display. For example, the appearance of the physical environment may be augmented by graphical content that is presented via the transparent display 402 to create a mixed reality environment. In one example, the display may be configured to display one or more visual digital content items. In some cases, the digital content items may be virtual objects overlaid in front of the real-world environment. Likewise, in some cases, the digital content items may incorporate elements of real-world objects of the real-world environment seen through the transparent display 402.

Any suitable mechanism may be used to display images via transparent display 402. For example, transparent display 402 may include image-producing elements located within lenses 406 (such as, for example, a see-through Organic Light-Emitting Diode (OLED) display). As another example, the transparent display 402 may include a light modulator located within a frame of HMD device 400. In this example, the lenses 406 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 400 may also include various sensors and related systems to provide information to the controller 404. Such sensors may include, but are not limited to, one or more microphones 407 (or a microphone array), one or more outward-facing image sensors 408, and an inertial measurement unit (IMU) 410.

The one or more outward-facing image sensors 408 may be configured to capture visual data from the physical environment in which the HMD device 400 is located. For example, the outward-facing sensors 408 may be configured to detect movements within a field of view of the display 402, such as movements performed by a wearer or by a person or physical object within the field of view. In one example, the outward-facing sensors 408 may detect a user speaking to a wearer of the HMD device. The outward-facing sensors may also capture 2D image information and depth information from the physical environment and physical objects within the environment. As discussed above, data collected by the outward-facing sensors 408 may be used to recognize virtual and/or physical proxy views of contacts, and/or to recognize gesture input (e.g., hand gestures) supplied by a wearer to assess selection condition satisfaction for contacts.

The IMU 410 may be configured to provide position and/or orientation data of the HMD device 400 to the controller 404. In some implementations the IMU 410 may be configured as a three-axis or three-degree of freedom position sensor system, while in others, the IMU may be configured as a six-axis or six-degree of freedom position sensor system.

The HMD device 400 may further include speakers 424 and 426 configured to output sound to the wearer of the HMD device. The speakers 424 and 426 may be positioned on each side frame portion of the HMD device proximate to the wearer's ears.

The controller 404 may include a logic device and a storage device that may be in communication with the various sensors and display of the HMD device 400. In one example, the storage device may include instructions that are executable by the logic device to display, on the display, a user interface, receive, via the gaze sensor, a user input of a gaze direction, map the gaze direction to a point in the user interface, receive, via the outward-facing image sensor, a gesture input of an origin reset for a three-dimensional coordinate system, responsive to receiving the gesture input of the origin reset, reset an origin of the three-dimensional coordinate system, receive, via the outward-facing image sensor, three-dimensional user input in the three-dimensional coordinate system, while the origin remains set, measure, via the outward-facing image sensor, at least one three-dimensional displacement of the three-dimensional user input relative to the origin, and adjust a position of a user interface element displayed in the user interface along a direction of the at least one measured three-dimensional displacement beginning at the point to which the gaze direction is mapped.

HMD device 400 further comprises a gaze detection subsystem 409 configured to detect a direction of gaze of each eye of a user, as described above. The gaze detection subsystem 409 may be configured to determine gaze directions of each of a user's eyes in any suitable manner. For example, in the depicted embodiment, the gaze detection subsystem 409 comprises one or more glint sources 412, such as infrared light sources, configured to cause a glint of light to reflect from each eyeball of a user, and one or more image sensors 414 configured to capture an image of each eyeball of the user. Changes in the glints from the user's eyeballs as determined from image data gathered via image sensor(s) 414 may be used to determine a direction of gaze. Further, a location at which gaze lines projected from the user's eyes intersect the display may be used to determine an object at which the user is gazing (e.g., a virtual object displayed on the display). The gaze detection subsystem 409 may have any suitable number and arrangement of light sources and image sensors. In one non-limiting example embodiment, four glint sources and one image sensor are used for each eye.

Figure 5:
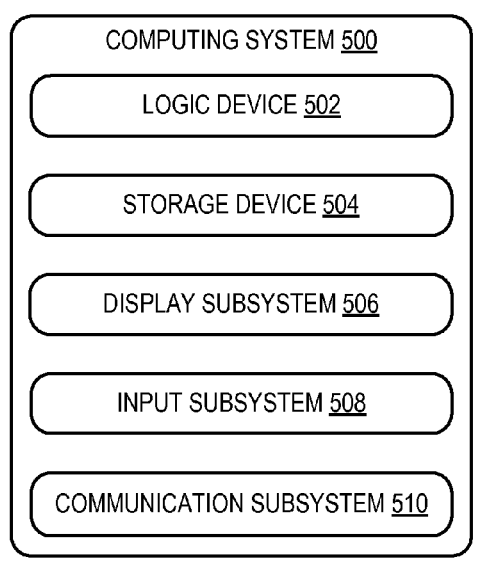
FIG. 5 shows an example computing system.

HMD device 400 is one example of a computing system on which the examples disclosed herein may be implemented. More generally, FIG. 5 schematically shows a block diagram of an example computing system 500 in simplified form. In addition to the HMD devices described herein, computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic device 502 and a storage device 504. Computing system 500 may optionally include a display subsystem 505, input subsystem 508, communication subsystem 510, and/or other components not shown in FIG. 5.

Logic device 502 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 505 may be used to present a visual representation of data held by storage device 504. This visual representation may take the form of a graphical user interface (GUI). As the herein described methods and processes change the data held by the storage device, and thus transform the state of the storage device, the state of display subsystem 505 may likewise be transformed to visually represent changes in the underlying data. Display subsystem 505 may include one or more display devices utilizing virtually any type of technology. Such display devices may be combined with logic device 502 and/or storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a method of processing user input in a three-dimensional coordinate system, comprising receiving a user input of an origin reset for the three-dimensional coordinate system, responsive to receiving the user input of the origin reset, resetting an origin of the three-dimensional coordinate system, receiving three-dimensional user input in the three-dimensional coordinate system, while the origin remains set, measuring at least one three-dimensional displacement of the three-dimensional user input relative to the origin, and causing movement of a user interface element displayed in a user interface, the movement based on the at least one measured three-dimensional displacement. In such an example, causing the movement may alternatively or additionally include translating the user interface element along a direction of the at least one three-dimensional displacement. In such an example, causing the movement may alternatively or additionally include translating the user interface element a distance, the distance determined by scaling a magnitude of the three-dimensional displacement. In such an example, the method may alternatively or additionally comprise, responsive to the three-dimensional displacement exceeding a threshold displacement, resetting the origin of the three-dimensional coordinate system. In such an example, causing the movement may alternatively or additionally include translating the user interface element at a speed proportional to a speed at which the three-dimensional displacement was supplied. In such an example, the user input of the origin reset may alternatively or additionally comprise a hand gesture. In such an example, the user input of the origin reset may alternatively or additionally comprise voice input. In such an example, the user interface element may alternatively or additionally be selected by a user input of a gaze direction. In such an example, the three-dimensional user input may alternatively or additionally be received via a depth camera. In such an example, the method may alternatively or additionally comprise, while the origin remains set, displaying the origin in the user interface. In such an example, causing the movement may alternatively or additionally include scrolling the user interface element. Any or all of the above-described examples may be combined in any suitable manner in various implementations.

Another example provides a method of processing user input in a three-dimensional coordinate system, comprising receiving a user input of a gaze direction, mapping the gaze direction to a point in a user interface, receiving a user input of an origin reset for the three-dimensional coordinate system, responsive to receiving the user input of the origin reset, resetting an origin of the three-dimensional coordinate system, receiving three-dimensional user input in the three-dimensional coordinate system, while the origin remains set, measuring at least one three-dimensional displacement of the three-dimensional user input relative to the origin, and causing movement of a user interface element displayed in the user interface, the movement based on the at least one measured three-dimensional displacement and beginning at the point to which the gaze direction is mapped. In such an example, the point to which the gaze direction is mapped may alternatively or additionally overlap the user interface element. In such an example, causing the movement of the user interface element may alternatively or additionally include translating the user interface element along a direction of the three-dimensional displacement. In such an example, the method may alternatively or additionally comprise determining a vector based on the three-dimensional displacement, a tail of the vector located at the point to which the gaze direction is mapped. In such an example, the method may alternatively or additionally comprise, responsive to the three-dimensional displacement exceeding a threshold displacement, resetting the origin of the three-dimensional coordinate system. Any or all of the above-described examples may be combined in any suitable manner in various implementations.

Another example provides a head mounted display device, comprising a display, an outward-facing image sensor, and a computing device comprising a processor and a storage device holding instructions executable by the processor to display, on the display, a user interface, receive, via the outward-facing image sensor, a user input of an origin reset for a three-dimensional coordinate system, responsive to receiving the user input of the origin reset, reset an origin of the three-dimensional coordinate system, receive three-dimensional user input in the three-dimensional coordinate system, while the origin remains set, measure, via the outward-facing image sensor, at least one three-dimensional displacement of the three-dimensional user input relative to the origin, and cause movement of a user interface element displayed in the user interface, the movement based on the at least one measured three-dimensional displacement. In such an example, the three-dimensional user input may alternatively or additionally be received via a three-dimensional input device held or worn by a user. In such an example, the three-dimensional user input may alternatively or additionally be received via the outward-facing image sensor. In such an example, the instructions may alternatively or additionally be further executable to receive, via a gaze sensor, a user input of a gaze direction, and map the gaze direction to a point in the user interface, wherein the movement of the user interface element begins at the point to which the gaze direction is mapped. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of processing user input in a three-dimensional coordinate system, comprising:
   receiving a user input of an origin reset for the three-dimensional coordinate system;
   responsive to receiving the user input of the origin reset, resetting an origin of the three-dimensional coordinate system;
   receiving three-dimensional user input in the three-dimensional coordinate system;
   while the origin remains set, measuring at least one three-dimensional displacement of the three-dimensional user input relative to the origin; and
   causing movement of a user interface element displayed in a user interface, the movement based on the at least one measured three-dimensional displacement.

2. The method of claim 1, wherein causing the movement includes translating the user interface element along a direction of the at least one three-dimensional displacement.

3. The method of claim 1, wherein causing the movement includes translating the user interface element a distance, the distance determined by scaling a magnitude of the three-dimensional displacement.

4. The method of claim 1, further comprising, responsive to the three-dimensional displacement exceeding a threshold displacement, resetting the origin of the three-dimensional coordinate system.

5. The method of claim 1, wherein causing the movement includes translating the user interface element at a speed proportional to a speed at which the three-dimensional displacement was supplied.

6. The method of claim 1, wherein the user input of the origin reset comprises a hand gesture.

7. The method of claim 1, wherein the user input of the origin reset comprises voice input.

8. The method of claim 1, wherein the user interface element is selected by a user input of a gaze direction.

9. The method of claim 1, wherein the three-dimensional user input is received via a depth camera.

10. The method of claim 1, further comprising, while the origin remains set, displaying the origin in the user interface.

11. The method of claim 1, wherein causing the movement includes scrolling the user interface element.

12. A method of processing user input in a three-dimensional coordinate system, comprising:
  receiving a user input of a gaze direction;
  mapping the gaze direction to a point in a user interface;
  receiving a user input of an origin reset for the three-dimensional coordinate system;
  responsive to receiving the user input of the origin reset, resetting an origin of the three-dimensional coordinate system;
  receiving three-dimensional user input in the three-dimensional coordinate system;
  while the origin remains set, measuring at least one three-dimensional displacement of the three-dimensional user input relative to the origin; and
  causing movement of a user interface element displayed in the user interface, the movement based on the at least one measured three-dimensional displacement and beginning at the point to which the gaze direction is mapped.

13. The method of claim 12, wherein the point to which the gaze direction is mapped overlaps the user interface element.

14. The method of claim 12, wherein causing the movement of the user interface element includes translating the user interface element along a direction of the three-dimensional displacement.

15. The method of claim 12, further comprising determining a vector based on the three-dimensional displacement, a tail of the vector located at the point to which the gaze direction is mapped.

16. The method of claim 12, further comprising, responsive to the three-dimensional displacement exceeding a threshold displacement, resetting the origin of the three-dimensional coordinate system.

17. A head mounted display device, comprising:
  a display;
  an outward-facing image sensor; and
  a computing device comprising a processor and a storage device holding instructions executable by the processor to:
    display, on the display, a user interface;
    receive, via the outward-facing image sensor, a user input of an origin reset for a three-dimensional coordinate system;
    responsive to receiving the user input of the origin reset, reset an origin of the three-dimensional coordinate system;
    receive three-dimensional user input in the three-dimensional coordinate system;
    while the origin remains set, measure, via the outward-facing image sensor, at least one three-dimensional displacement of the three-dimensional user input relative to the origin; and
    cause movement of a user interface element displayed in the user interface, the movement based on the at least one measured three-dimensional displacement.

18. The method of claim 17, wherein the three-dimensional user input is received via a three-dimensional input device held or worn by a user.

19. The method of claim 17, wherein the three-dimensional user input is received via the outward-facing image sensor.

20. The method of claim 17, wherein the instructions are further executable to:
  receive, via a gaze sensor, a user input of a gaze direction; and
  map the gaze direction to a point in the user interface,
  wherein the movement of the user interface element begins at the point to which the gaze direction is mapped.

* * * * *